United States Patent
Jeon

(10) Patent No.: US 8,868,307 B2
(45) Date of Patent: Oct. 21, 2014

(54) SHIFT CONTROL METHOD OF AUTOMATIC TRANSMISSION

(75) Inventor: Byeong Wook Jeon, Seoul (KR)

(73) Assignees: Hyundai Motor Company, Seoul (KR); Kia Motors Corp., Seoul (KR)

(*) Notice: Subject to any disclaimer, the term of this patent is extended or adjusted under 35 U.S.C. 154(b) by 414 days.

(21) Appl. No.: 13/292,638

(22) Filed: Nov. 9, 2011

(65) Prior Publication Data

US 2012/0318626 A1 Dec. 20, 2012

(30) Foreign Application Priority Data

Jun. 20, 2011 (KR) ........................ 10-2011-0059546

(51) Int. Cl.
- *F16H 61/06* (2006.01)
- *B60K 6/387* (2007.10)
- *F16D 48/02* (2006.01)
- *F16H 61/04* (2006.01)
- *F16H 61/68* (2006.01)
- *F16H 61/02* (2006.01)

(52) U.S. Cl.
CPC ............... *F16H 61/02* (2013.01); *F16H 61/06* (2013.01); *F16H 61/04* (2013.01); *F16H 61/68* (2013.01)
USPC ................. 701/67; 180/65.265; 192/85.63; 192/82 T

(58) Field of Classification Search
CPC .......... F16H 2306/30; F16H 2061/064; F16H 2061/065
See application file for complete search history.

(56) References Cited

U.S. PATENT DOCUMENTS

| | | | |
|---|---|---|---|
| 5,944,630 A * | 8/1999 | Omote | 477/5 |
| 6,346,063 B1 * | 2/2002 | Kondo et al. | 477/143 |
| 6,577,939 B1 * | 6/2003 | Keyse et al. | 701/55 |

FOREIGN PATENT DOCUMENTS

| | | |
|---|---|---|
| JP | 10-103466 | 4/1998 |
| JP | 2008-064156 | 3/2008 |
| KR | 10-2011-0011440 A | 12/2007 |

* cited by examiner

*Primary Examiner* — Gene Crawford
*Assistant Examiner* — Mark Manley
(74) *Attorney, Agent, or Firm* — Morgan, Lewis & Bockius LLP

(57) ABSTRACT

A shift control method of an automatic transmission may include detecting an end point of an inertia section during upshifting, momentarily reducing a hydraulic pressure applied to engagement side frictional elements at the detected end point of the inertia section, increasing the reduced hydraulic pressure with a predetermined gradient until reaching a synchronization point, and momentarily increasing the hydraulic pressure when the synchronization point may be reached.

6 Claims, 3 Drawing Sheets

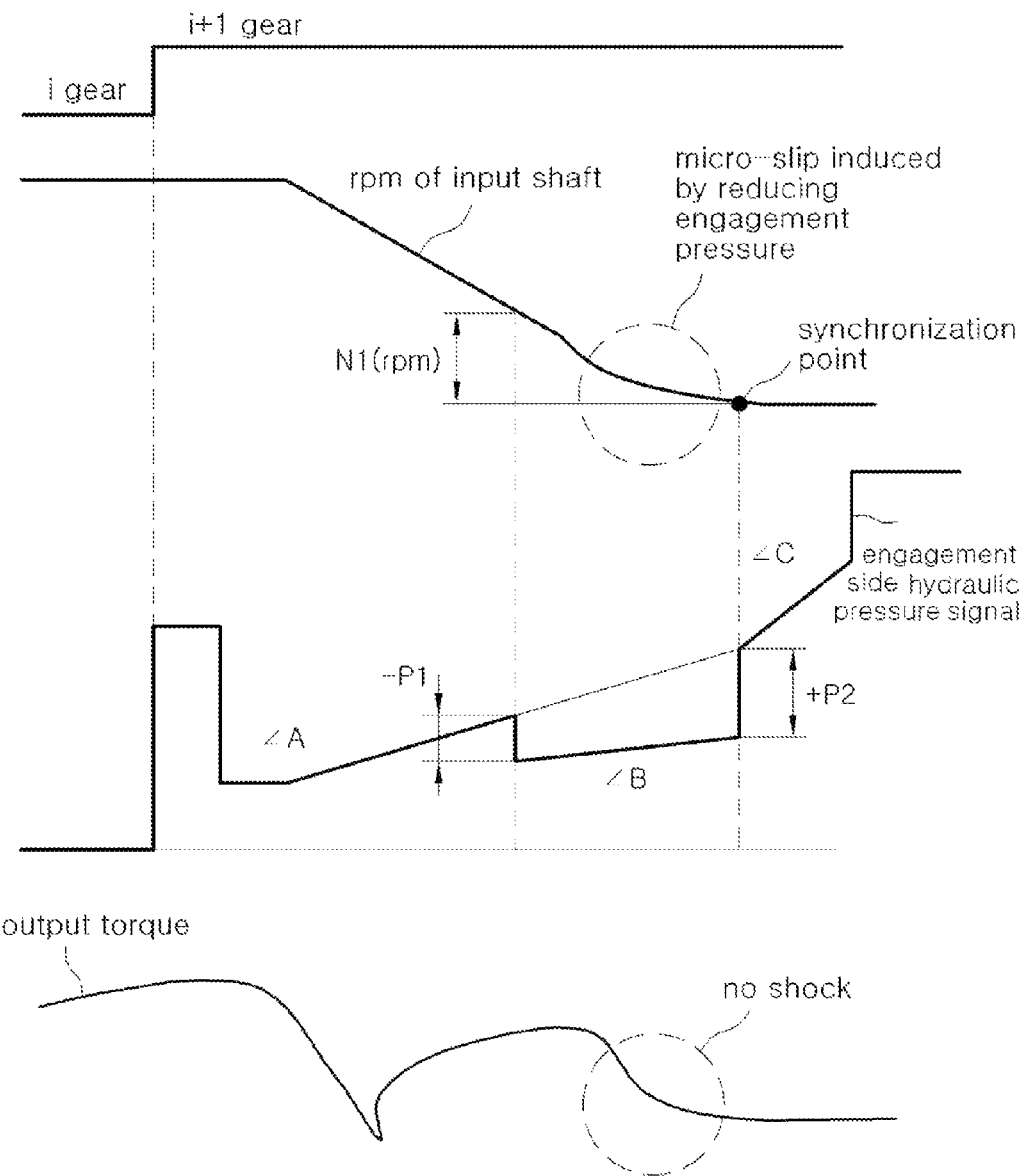

SHIFT CONTROL METHOD OF AUTOMATIC TRANSMISSION

CROSS-REFERENCE TO RELATED APPLICATIONS

The present application claims priority to Korean Patent Application No. 10-2011-0059546 filed on Jun. 20, 2011, the entire contents of which is incorporated herein for purposes by this reference.

BACKGROUND OF THE INVENTION

1. Field of the Invention

The present invention relates generally to a shift control method of an automatic transmission and, more particularly, to a technique for mitigating shift shock when upshifting.

2. Description of Related Art

The ultimate goal of controlling an automatic transmission is embodying smooth shifting performance. In the conventional technique, hydraulic power transmission apparatuses, such as torque converters, have played an important role in ensuring such smooth shifting performance.

That is, such a conventional torque converter itself absorbs a large proportion of the vibrations or shocks which occurs in a power transmission system due to variations in torque when shifting gears. Thereby, smooth shifting performance can be achieved.

However, in a parallel hybrid system or the like in which an electric motor in place of a torque converter is coupled to an input shaft of a transmission by a rigid body, there is no hydraulic clutch which physically absorbs variations in torque which is induced when shifting gears. Therefore, such variation in torque just causes shift shock, thus markedly deteriorating shifting performance.

In particular, at a late stage of a shifting process, rapid variations in torque are typically induced. In the case of the conventional system provided with the torque converter, slip operation of the torque converter absorbs the majority of such rapid variations in torque, but in the case of a system having no torque converter, rapid variations in torque at the late stage of the shifting process are responsible for deterioration of the shifting performance.

For example, FIG. 1 illustrates upshifting from i gear to i+1 gear in an automatic transmission provided with the conventional torque converter. Controlling engagement side hydraulic pressure for shifting includes increasing hydraulic pressure at gradient SL1 after a fill time at an initial stage of the shifting, and rapidly increasing the hydraulic pressure at gradient SL2 greater than the gradient SL1 when it reaches a synchronization point, thus completing the shifting. At the synchronization point, a shock occurs due to differences in speed and torque which exist between an output shaft and an input shaft. Such a shock can be absorbed by the conventional torque converter. However, in the case of a system having no torque converter, such a shock is just transmitted to the power transmission system as shift shock, thus markedly deteriorating the shifting performance of the vehicle.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a shift control method of an automatic transmission in which gears are shifted by engaging and releasing frictional elements using hydraulic pressure, and which is configured such that shift shock is mitigated or prevented from occurring at a late stage of the shifting, thus enhancing the shifting performance, thereby increasing the marketability of the vehicle.

For reference, the present invention can be applied not only to a conventional general automatic transmission provided with a torque converter but also to all types of automatic transmissions in which gears are shifted by engaging and releasing frictional elements using hydraulic pressure, regardless of the presence of a torque converter.

A shift control method of an automatic transmission, may include detecting an end point of an inertia section during upshifting, momentarily reducing a hydraulic pressure applied to engagement side frictional elements at the detected end point of the inertia section, increasing the reduced hydraulic pressure with a predetermined gradient until reaching a synchronization point, and momentarily increasing the hydraulic pressure when the synchronization point may be reached.

The detecting the end point of the inertia section during the upshifting includes detecting a point in time, at which an rpm of an input shaft becomes less than a value that may be obtained by multiplying an rpm of an output shaft by a target gear ratio and adding a predetermined rpm to a result of the multiplying, as the end point of the inertia section.

The momentarily reducing of the hydraulic pressure includes momentarily reducing the hydraulic pressure to a level determined depending on a function of a fluid temperature and a torque of an input shaft.

The predetermined gradient may be determined depending on a function of a fluid temperature and a torque of an input shaft.

After an initial fill time of the upshifting, before the momentarily reducing of the hydraulic pressure, the hydraulic pressure applied to the engagement side frictional elements increases with a first gradient determined by a function of a fluid temperature and a torque of an input shaft, and the predetermined gradient may be determined depending on a function of a fluid temperature and a torque of the input shaft and may be set as a second gradient less than the first gradient.

After an initial fill time of the upshifting, before the momentarily reducing of the hydraulic pressure, the hydraulic pressure applied to the engagement side frictional elements increases with a first gradient determined by a function of a fluid temperature and a torque of an input shaft, and the momentary increasing of the hydraulic pressure includes momentarily increasing the hydraulic pressure to a level which may be attainable when supposing that the hydraulic pressure increases at the first gradient to the synchronization point. After the momentary increasing of the hydraulic pressure, increasing the hydraulic pressure with a third gradient greater than the first gradient, thus completing the upshifting.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 3 is a graph illustrating the shift control method of the automatic transmission according to an exemplary embodiment of the present invention.

Figure 1:
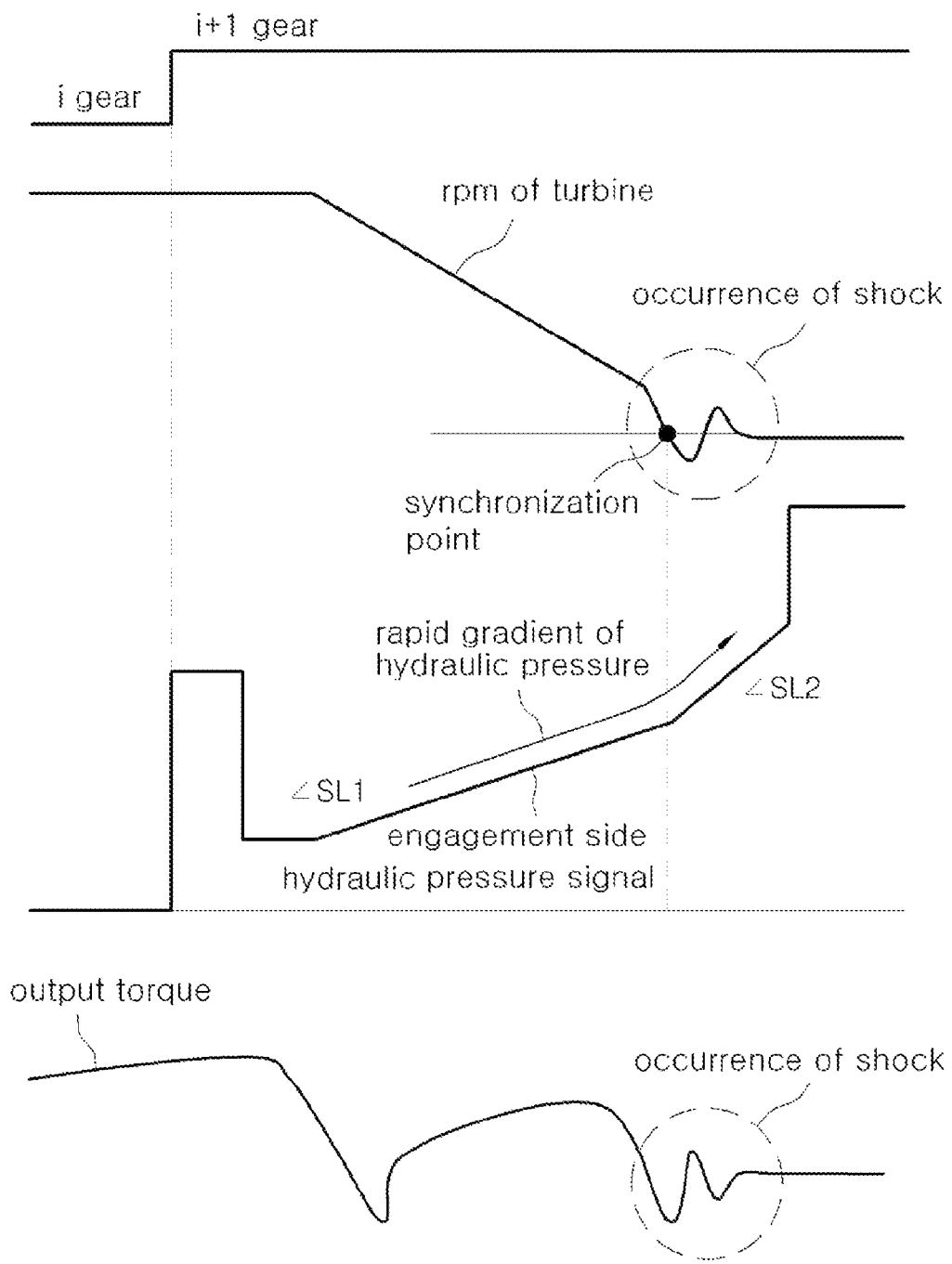
FIG. 1 is a graph illustrating a shift control method of an automatic transmission, according to a conventional technique.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter, the present invention will be described in detail with reference to the attached drawings.

Figure 2:
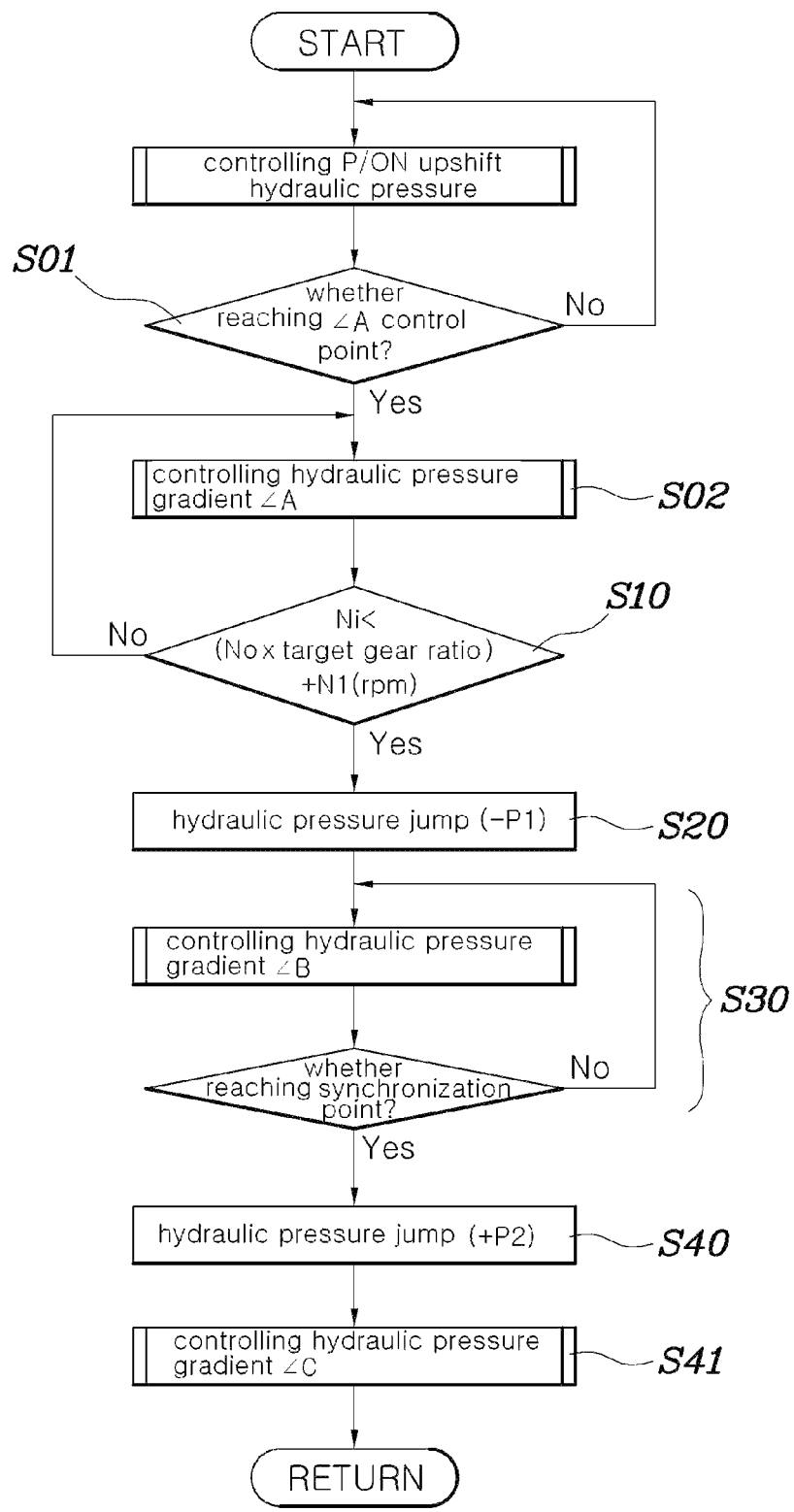
FIG. 2 is a flowchart of a shift control method of an automatic transmission, according to an exemplary embodiment of the present invention.

Referring to FIGS. 2 and 3, a shift control method of an automatic transmission according to an exemplary embodiment of the present invention includes a first step S10 of detecting an end point of an inertia section during upshifting. At a second step S20, hydraulic pressure which is applied to engagement side frictional elements at the detected end point of the inertia section, is momentarily reduced. At a third step S30, the reduced hydraulic pressure increases at a predetermined gradient until reaching a synchronization point. At a fourth step S40, when reaching the synchronization point, the hydraulic pressure is momentarily raised.

In other words, between a fill time and the synchronization point during upshifting, the shift control method includes an operation wherein a control hydraulic pressure of the engagement side frictional elements, which had slowly increased, is brought down to a predetermined level, thus inducing micro-slip of the engagement side frictional elements. Then, shift shock can be absorbed or mitigated by the slip.

For reference, in the present embodiment, the case of power-on upshift is illustrated as one example, however, the present invention may be applied to the case of power-off upshift, such as inertia traveling condition.

After the fill time, in which hydraulic pressure that is applied to the engagement side frictional elements is charged into space at an initial stage after the upshifting begins, has passed, when a predetermined time period has passed (at step S01), hydraulic pressure that is applied to engagement side frictional elements slowly increases at a first gradient A (at step S02). Here, the first gradient A is a predetermined value which is determined by a function of a fluid temperature and the torque of an input shaft.

Thereby, the rpm Ni of the input shaft is slowly reduced. At step S10, detected as the end point of the inertia section is the point in time at which the rpm Ni of the input shaft becomes less than a value that is obtained by multiplying the rpm No of the output shaft by a target gear ratio and adding a predetermined rpm N1 to the results of the multiplying.

In other words, in an exemplary embodiment of the present invention, the end point of the inertia section is regarded as being before the point in time when shift shock occurs at a late stage of the shifting, and the second step S20 through the fourth step S40, through which the pressure reducing process is conducted, are carried out from the end point of the inertia section. The determination of the end point of the inertia section includes determining whether a ratio between the rpm Ni of the input shaft and the rpm No of the output shaft has reached a predetermined speed ratio.

Therefore, the predetermined rpm NI to be added to the result of multiplying the rpm No of the output shaft by the target gear ratio is a constant which is appropriately determined depending on a difference in rpm between the input shaft and the output shaft when reaching a satisfactory speed ratio. This can be determined by a test and an analysis.

The hydraulic pressure that is momentarily reduced at the second step S20 is determined by a function of the fluid temperature and the torque of the input shaft. Further, the predetermined gradient at which the hydraulic pressure increases at the third step S30 is determined by another function of the fluid temperature and the torque of the input shaft. These may be obtained from a data map which was previously stored or, alternatively, they may be obtained by calculating special functional formulas.

As such, the predetermined gradient at which the hydraulic pressure increases at the third step S30 is determined by a function of the fluid temperature and the torque of the input shaft, wherein it is determined that a second gradient B less than the first gradient A.

That is, at the third step S30, the hydraulic pressure that has been rapidly reduced at the second step S20 is slowly increased at the second gradient B which is less than the first gradient A at which the hydraulic pressure increases at a step before the third step S30. Thereby, micro-slip of the engagement side frictional elements can be smooth.

Meanwhile, the hydraulic pressure which is momentarily increased at the fourth step S40 increases to a level which is attainable when it is assumed that the hydraulic pressure increases along the first gradient A to the synchronization point. After the fourth step, the hydraulic pressure increases along a third gradient C greater than the first gradient A (at step S41) so that the shifting can be rapidly completed.

As such, the present invention conducts a series of pressure processes including: momentarily reducing hydraulic pressure to a level less than a pressure that has increased at a first gradient A, increasing the hydraulic pressure at a second gradient B less than the first gradient A, and momentarily increasing the hydraulic pressure to a level which is attainable when it is assumed that the hydraulic pressure increases along the first gradient A to the synchronization point. Thus, differences in speed and torque between the input shaft and the output shaft which have been present at the late stage of the shifting process are taken care of by micro-slip of the engagement side frictional elements, thus preventing shift shock from occurring or reducing it.

As described above, the present invention provides a shift control method of an automatic transmission in which gears are shifted by engaging and releasing frictional elements using hydraulic pressure. The shift control method is configured such that shift shock is mitigated or prevented from occurring at a late stage of the shifting, thus enhancing the shifting performance, thereby increasing the marketability of the vehicle.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A shift control method of an automatic transmission, comprising:

detecting an end point of an inertia section during upshifting;

momentarily reducing a hydraulic pressure applied to engagement side frictional elements at the detected end point of the inertia section;

increasing the reduced hydraulic pressure with a predetermined gradient until reaching a synchronization point; and momentarily increasing the hydraulic pressure when the synchronization point is reached;

wherein the detecting the end point of the inertia section during the upshifting includes detecting a point in time, at which an rpm of an input shaft becomes less than a value that is obtained by multiplying an rpm of an output shaft by a target gear ratio and adding a predetermined rpm to a result of the multiplying, as the end point of the inertia section.

2. The shift control method as set forth in claim 1, wherein the momentarily reducing of the hydraulic pressure includes momentarily reducing the hydraulic pressure to a level determined depending on a function of a fluid temperature and a torque of an input shaft.

3. The shift control method as set forth in claim 1, wherein the predetermined gradient is determined depending on a function of a fluid temperature and a torque of an input shaft.

4. The shift control method as set forth in claim 1, wherein after an initial fill time of the upshifting, before the momentarily reducing of the hydraulic pressure, the hydraulic pressure applied to the engagement side frictional elements increases with a first gradient determined by a function of a fluid temperature and a torque of an input shaft, and the predetermined gradient is determined depending on a function of a fluid temperature and a torque of the input shaft and is set as a second gradient less than the first gradient.

5. The shift control method as set forth in claim 1, wherein after an initial fill time of the upshifting, before the momentarily reducing of the hydraulic pressure, the hydraulic pressure applied to the engagement side frictional elements increases with a first gradient determined by a function of a fluid temperature and a torque of an input shaft, and the momentary increasing of the hydraulic pressure comprises momentarily increasing the hydraulic pressure to a level which is attainable when supposing that the hydraulic pressure increases at the first gradient to the synchronization point.

6. The shift control method as set forth in claim 5, further comprising: after the momentary increasing of the hydraulic pressure, increasing the hydraulic pressure with a third gradient greater than the first gradient, thus completing the upshifting.

* * * * *